UNITED STATES PATENT OFFICE.

HENRY D. WINTON, OF WELLESLEY HILLS, MASSACHUSETTS, ASSIGNOR OF ONE-HALF TO FRANCIS C. HERSEY, OF WELLESLEY HILLS, MASSACHUSETTS.

PROCESS OF PRESERVING CEREAL FOODS.

SPECIFICATION forming part of Letters Patent No. 713,580, dated November 11, 1902.

Application filed December 21, 1901. Serial No. 86,749. (No specimens.)

*To all whom it may concern:*

Be it known that I, HENRY D. WINTON, a citizen of the United States, residing at Wellesley Hills, in the county of Norfolk and State of Massachusetts, have invented a new and useful Improvement in Methods for the Treatment of Cereals, of which the following is a full, clear, and exact description.

My invention relates to a method of treating cereal foods for the purpose of retaining a perfectly clean, wholesome, and palatable food put up in a form to best protect it against deterioration by molding, souring, and the action of germs. I am aware that many attempts have been made to protect this class of foods by sterilization, chemical treatment, coating of the granules, and pressing them into cakes or packages; but none of the processes has proved efficient, or if efficient in some respects the processes have failed in others, so that the products were not marketable.

By my improved process I am enabled not only to treat the cereals in a simple and effectual way, but I am enabled to put the food into a marketable condition, by which it is preserved in a perfectly clean, wholesome, palatable, and attractive form and in a manner to best protect it against molding, souring, and the germination of bacteria and against putrefaction of organisms.

My method or process, together with the various modifications of it, may be explained as follows: The stages of the process consist in first cleansing the natural or uncooked cereal before it has been crushed or ground to the desired granulation by passing it through a machine, which removes all dust and dirt, then passing it through a stirring-machine, which thoroughly stirs the granulated product while a small amount of syrup, composed of sugar and water, is being fed to it, so that each particle by the action of this stirring is coated with a film of this syrup, then feeding the moistened granulated product to the hopper of the molding-machine, which automatically compresses it into small cubes, blocks, or tablets and delivers them upon suitable plates, which are placed in heated ovens and when thoroughly dried removing these blocks or tablets from the ovens and packing them in suitable boxes or cartons for the market.

In further elaboration of this process after putting the crushed cereal in as wholesome condition as possible I mix it with a syrup of sugar which is preferably dissolved in cold water, or, at any rate, which is not a cooked syrup, which should be of a gage of 30° Baumé scale. This depends upon the character of the cereal to be treated and the character of the granulation, a greater or less quantity being used and of a more or less density, according to the product which is being treated. The syrup acts to coat each granular particle of the cereal and protect it against deterioration and at the same time acts as a cementing agent to hold the granules together when they are compressed. The granules are compressed while they are still moist with the syrup into small blocks or tablets and when delivered from the press in soft blocks are immediately transferred to heated ovens to thoroughly dry them and evaporate all moisture. The granules are then wholly coated by a film of syrup, which keeps out the air, and then again each granule is protected by its neighbors by being pressed into a mass, thus leaving the finished block or crushed cereal as entirely protected as possible, and when packed closely together in boxes it is thoroughly protected against deterioration by the action of germs and putrefaction of the same and also against danger of molding or souring, being free from moisture and protected from atmospheric conditions which would otherwise act to destroy it. Further, the cereals so treated retain their natural appearance, as the coating with syrup does not soak perceptibly into the particles, so that the fiber is liable to be broken or crushed down under pressure; but the cereal retains its granulated appearance in the blocks or tablets, and on the evaporation of the water of the syrup there is no gloss or pasty appearance given to the product; but it has all the desirable treatment for protection, while its appearance is not in any way deteriorated.

It should be understood that the invention herein described relates only to the treatment of the forms of cereals now commonly used for food and that the purpose of the invention is not in any way to change the shape of the granules of such cereals or their properties when cooked, but simply to preserve their present qualities in a more permanent way by affording a protection against such destructive tendencies as they are now subject to. To this end the granules as ordinarily prepared for the market are first subjected to antisepsis, (and I prefer for this purpose that a material be used which shall also act to bind or tie together the granules in the form of a block and which shall be made hard and non-adhesive by heat.) Preferably I use the sugar or syrup for this purpose; but any adhesive and preserving fluid having the characteristics of the sugar or syrup may be substituted therefor. It is not intended that the substance used for this purpose shall in any way affect the quality or flavor of the cereals when cooked. It is applied to the granules in very thin films and while in a warm and moist condition, and the granules thus provided with thin films are combined together by light pressure while they are still warm and moist, and this is done without fracturing or opening the individual films or coatings or crushing the granules. The antiseptic coating is then hardened and made absolutely non-adhesive by subjecting the block to a drying influence, preferably in an oven. The degree of the coating applied to the granules is of the slightest. It is not sufficient to sweeten the cooked cereal. It is not even sufficient to cause the granules to adhere together without the use of a mild pressure, and it would be of no value as a binding agent were it not capable of being hardened by drying. There are some cereals which have been partially treated by heat, so that they are not entirely uncooked; but for the purposes of this invention or discovery they may be considered substantially uncooked foods.

Having thus described my invention or discovery, I claim and desire to secure by Letters Patent—

1. The herein-described method of treating cereal foods for preserving the same, such method comprising the following steps: subjecting the granulated cereal of the character specified to antisepsis by mixing it with a thin sugar syrup for the purpose of coating the granules, compressing the coated granules into blocks without breaking the granules or their coatings, and subjecting the said blocks to a drying temperature whereby the antiseptic coatings are hardened and made non-adhesive.

2. The method of treating cereal foods of the character specified for preserving the same, such method comprising the following steps: thoroughly cleansing the granulated cereal, subjecting the same to antisepsis by mixing with the granulated cereal a thin sugar syrup while the said granulated cereal is being rapidly agitated and for the purpose of coating the granules, compressing the coated granules into blocks without breaking the granules or their coatings, and subjecting the said blocks to a drying temperature for the purpose of hardening the coatings and rendering them non-adhesive.

HENRY D. WINTON.

In presence of—
J. M. DOLAN,
J. E. R. HAYES.